United States Patent
Yang et al.

(10) Patent No.: US 11,394,811 B2
(45) Date of Patent: Jul. 19, 2022

(54) REDIRECTION HANDLING

(71) Applicant: Telefonaktiebolaget LM Ericsson (publ), Stockholm (SE)

(72) Inventors: Jiehong Yang, Mölndal (SE); Carlos Jimenez Cordon, Madrid (ES); Miguel Angel Muñoz De La Torre Alonso, Madrid (ES); Yumei Song, Gothenburg (SE); Yong Yang, Kållered (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/970,082

(22) PCT Filed: Feb. 13, 2019

(86) PCT No.: PCT/EP2019/053572
§ 371 (c)(1),
(2) Date: Aug. 14, 2020

(87) PCT Pub. No.: WO2019/158598
PCT Pub. Date: Aug. 22, 2019

(65) Prior Publication Data
US 2020/0412833 A1    Dec. 31, 2020

Related U.S. Application Data

(60) Provisional application No. 62/630,901, filed on Feb. 15, 2018.

(51) Int. Cl.
*H04L 67/63* (2022.01)
*H04W 4/50* (2018.01)
(Continued)

(52) U.S. Cl.
CPC .............. *H04L 67/63* (2022.05); *H04L 67/02* (2013.01); *H04L 67/141* (2013.01); *H04W 4/50* (2018.02); *H04W 8/02* (2013.01)

(58) Field of Classification Search
None
See application file for complete search history.

(56) References Cited

U.S. PATENT DOCUMENTS

| | | | |
|---|---|---|---|
| 2005/0078668 A1* | 4/2005 | Wittenberg | H04L 12/2856 370/389 |
| 2009/0279492 A1* | 11/2009 | Montemurro | H04W 76/19 370/329 |

(Continued)

OTHER PUBLICATIONS

International Search Report and the Written Opinion of the International Searching Authority, issued in corresponding International Application No. PCT/EP2019/053572, dated May 21, 2019, 11 pages.

(Continued)

*Primary Examiner* — Kevin T Bates
*Assistant Examiner* — Emad Siddiqi
(74) *Attorney, Agent, or Firm* — Rothwell, Figg, Ernst & Manbeck, P.C.

(57) ABSTRACT

A method performed by a user plane, UP. The method includes determining whether a redirect message should be sent to a user equipment, UE, that has transmitted a first message intended for a first server, wherein the determining comprises: i) receiving a message transmitted by the first server and determining, based on the message, whether a redirect message should be sent to the UE or ii) detecting a timeout with respect to the first server; and, as a result of determining that redirect message should be sent to the UE, sending to the UE the redirect message, wherein the redirect message is configured to cause the UE to send a second message to a second server.

19 Claims, 11 Drawing Sheets

(51) Int. Cl.
    *H04L 67/02*     (2022.01)
    *H04L 67/141*     (2022.01)
    *H04W 8/02*     (2009.01)

(56) References Cited

U.S. PATENT DOCUMENTS

| | | | |
|---|---|---|---|
| 2015/0282048 A1 | 10/2015 | Zhang et al. | |
| 2016/0036830 A1* | 2/2016 | Martini | H04L 67/2842 |
| | | | 726/23 |
| 2016/0100375 A1* | 4/2016 | Chiduruppa | H04L 65/1073 |
| | | | 455/435.1 |
| 2017/0142773 A1 | 5/2017 | Nair et al. | |
| 2018/0199243 A1* | 7/2018 | Bharatia | H04W 36/0027 |
| 2018/0295134 A1* | 10/2018 | Gupta | H04L 63/029 |

OTHER PUBLICATIONS

3GPP TS 23.214 v14.2.0, 3rd Generation Partnership Project; Technical Specification Group Services and System Aspects; Architecture enhancements for control and user plane separation of EPC nodes; Stage 2 (Release 14) (Mar. 2017) 78 pages.

3GPP TS 29.244 v14.1.0, 3rd Generation Partnership Project; Technical Specification Group Core Network and Terminals; Interface between the Control Plane and the User Plane of EPC Nodes; Stage 3 (Release 14) (Sep. 2017) 146 pages.

\* cited by examiner

| Octets | Bits 8 7 6 5 4 3 2 1 |
|---|---|
| 1-2 | Type = 38 (decimal) |
| 3-4 | Length = n |
| 5 | Spare / Redirect Address Type |
| 6-7 | Redirect Server Address Length=a |
| 8-(8+a) | Redirect Server Address |
| (8+a+1) to (n+4) | These octet(s) is/are present only if explicitly specified |

FIG. 9

| Octets | Bits | | | | | | | |
|---|---|---|---|---|---|---|---|---|
| | 8 | 7 | 6 | 5 | 4 | 3 | 2 | 1 |
| 1-2 | Type = 38 (decimal) | | | | | | | |
| 3-4 | Length = n | | | | | | | |
| 5 | Spare | | | | Redirect Address Type | | | |
| 6-7 | Redirect Server Address Length=a | | | | | | | |
| 8-(8+a) | Redirect Server Address | | | | | | | |
| (8+a+1) to (n+4) | These octet(s) is/are present only if explicitly specified | | | | | | | |

FIG. 10

| Octets | Bits | | | | | | | |
|---|---|---|---|---|---|---|---|---|
| | 8 | 7 | 6 | 5 | 4 | 3 | 2 | 1 |
| 1 to 2 | Type = 43 (decimal) | | | | | | | |
| 3 to 4 | Length = n | | | | | | | |
| 5 to 6 | Supported-Features | | | | | | | |
| 7 to (n+4) | These octet(s) is/are present only if explicitly specified | | | | | | | |

FIG. 11

REDIRECTION HANDLING

CROSS REFERENCE TO RELATED APPLICATION(S)

This application is a 35 U.S.C. § 371 National Phase of PCT/EP2019/053572, filed Feb. 13, 2019, designating the United States, which claims the benefit of U.S. Provisional Application No. 62/630,901, filed Feb. 15, 2018, the disclosure of which are incorporated by this reference.

TECHNICAL FIELD

Embodiments herein relate to supporting redirection based on response codes and timeout under CP and UP separation.

BACKGROUND

FIG. 1 shows the architecture reference model in the case of separation between control plane and user plane. FIG. 1 is from 3GPP TS 23.214 V15.1.0 (2017 December). This architecture reference model covers non-roaming as well as home routed and local breakout roaming scenarios. Using other words, the FIG. 1 illustrates the architecture for GTP-based interfaces when SGW, PGW and TDF control and user planes are separated.

The -C or -U suffix appended to S2a, S2b, S5 and S8 existing reference points only indicate the control plane and user plane components of those interfaces.

The architecture in FIG. 1 only depicts the case when the CP and UP functions of all SGW, PGW and TDF nodes are split. However, the other cases when the CP and UP function of only one of these nodes is split while the CP and UP function of the other interfacing node is not split, e.g. PGW's control plane and user plane is split while SGW's control plane and user plane is not split, are also supported. The split architecture of a node does not put any architectural requirements on the peer nodes with which it interfaces. TDF may be an optional functional entity.

For a roaming architecture with local breakout, the Gx interface is defined between the PGW-C and PCRF in the visited network.

FIG. 2 illustrates an example of a combined SGW/PGW architecture in the case of separation between control plane and user plane. FIG. 2 is also from 3GPP TS 23.214 V15.1.0 (2017 December).

The usage of a combined SGW/PGW remains possible in a deployment with separated control and user planes. This is enabled by supporting an Sx interface with a common parameter structure for non-combined and combined cases.

Sxa: Reference point between SGW-C and SGW-U.
Sxb: Reference point between PGW-C and PGW-U.
Sxc: Reference point between TDF-C and TDF-U.

3GPP TS 29.244 V14.1.0 (2017 September) subclause 5.4.7 states "Traffic Redirection refers to the process of redirecting uplink application traffic" and subclause 8.2.20 specifies Sx interface support for Redirection. These subclauses are reproduced below:
"5.4.7 Traffic Redirection Traffic Redirection refers to the process of redirecting uplink application traffic, in a PGW or TDF, towards a redirect destination, e.g. redirect some HTTP flows to a service provisioning page. See subclause 6.1.13 of 3GPP TS 23.203 [7] and subclauses 4.5.2.6 and 4b.5.1.4 of 3GPP TS 29.212 [8].

The redirect destination may be provided by the PCRF or be preconfigured in the CP function or in the UP function.

The traffic redirection may be enforced in the CP function or in the UP function. If the traffic that the UP function can support may be subject to traffic redirection, traffic redirection enforcement in the UP function shall be supported by the UP function. The UP function reports to the CP function whether it supports traffic redirection enforcement in the UP function via the UP Function Features IE (see subclause 8.2.25).

NOTE: A UP function that supports traffic not requiring traffic redirection does not need to support traffic redirection enforcement in the UP function. The CP function can select a UP function supporting traffic redirection enforcement in the UP function for users or services which may require traffic redirection.

To enforce the traffic redirection in the CP function, the CP function shall instruct the UP function to forward the applicable user traffic to the CP function, as specified in subclause 5.3.1.

To enforce the traffic redirection in the UP function, the CP function shall:
create the necessary PDR(s) to represent the traffic to be redirected, if not already existing;
create a FAR with:
the Redirect Information IE including the redirect destination, if the traffic needs to be redirected towards a redirect destination provided by the CP function; a redirect destination provided by the CP function shall prevail over a redirect destination preconfigured in the UP function; or
the Forwarding Policy IE including the identifier of the forwarding policy to apply, if the traffic needs to be redirected towards a redirect destination preconfigured in the UP function;
associate the FAR to the above PDRs of the Sx session."
"8.2.20 Redirect Information Redirect Information is coded as depicted in FIG. 9.

Redirect Address Type indicates the type of the Redirect Address. It shall be encoded as defined in Table 8.2.20-1.

TABLE 8.2.20-1

Redirect Address Type

| Redirect Address Type | Value (Decimal) |
| --- | --- |
| IPv4 address | 0 |
| IPv6 address | 1 |
| URL | 2 |
| SIP URI | 3 |
| Spare, for future use. | 4 to 15 |

The Redirect Server Address Length shall indicate the length of the Redirect Server Address.

The Redirect Server Address shall be encoded in UTF8String format and shall contain the address of the redirect server (e.g. HTTP redirect server, SIP server) with which the end user is to be connected, as specified in subclauses 8.38 and 8.39 of IETF RFC 4006 [16]."

As seen in the above reproduced sections from 3GPP TS. 29.244, it has only specified support for Redirection triggered when the uplink request is received, Therefore, there is a need to at least mitigate or solve this issue.

SUMMARY

An objective of embodiments herein is therefore to obviate at least one of the above disadvantages and to provide improved redirection.

Accordingly, in one aspect there is provided a method performed by a user plane, UP, which method includes the UP determining whether a redirect message should be sent to a user equipment, UE, that has transmitted a first message intended for a first server, wherein the determining comprises: i) receiving a message transmitted by the first server and determining, based on the message, whether a redirect message should be sent to the UE or ii) detecting a timeout with respect to the first server. The method also includes the UP sending to the UE the redirect message as a result of the UP determining that redirect message should be sent to the UE. The redirect message is configured to cause the UE to send a second message to a second server.

In some embodiments, the method also includes the UP receiving a redirection rule transmitted by a control plane, CP.

In some embodiments, determining whether a redirect message should be sent to the UE comprises receiving the message transmitted by the first server and determining whether the message includes a redirection parameter that matches any redirection parameter included in a set of one or more redirection parameters, and, if the message includes a redirection parameter that matches any redirection parameter included in the set of one or more redirection parameters, then it is determined that the redirection should be sent to the UE.

In some embodiments, the set of redirection parameters include a set of one or more HTTP status codes.

In some embodiments, the set of HTTP status codes comprises status codes that begin with the digit 4 and/or status codes that begin with the digit 5.

In some embodiments, determining whether the message includes a redirection parameter that matches any redirection parameter included in a set of one or more redirection parameters comprises determining whether the redirection parameter included in the message matches any of the HTTP status codes included in the set of HTTP status codes.

In some embodiments, the redirect message is an HTTP message that includes a 302 status code and a URI pointing to the second server.

In some embodiments, receiving the redirection rule comprises receiving a message comprising the redirection rule, wherein the message is: an Sx Session Establishment Request message, an Sx Session Establishment Response message, an Sx Session Modification Request message, or an Sx Session Modification Response message.

In some embodiments, the redirection rule is a downlink, DL, Packet Detection Rule, PDR, that contains: packet detection information, PDI, and a forwarding action rule, FAR, identifier for identifying a FAR.

In some embodiments, the method comprises receiving a message transmitted by the first server and determining, based on the received message, whether a redirect message should be sent to the UE. Receiving the message transmitted by the first server comprises receiving DL traffic transmitted by the first server. The DL traffic comprises the message, and the method further comprises determining whether the DL traffic matches the DL PDR and activating the FAR as a result of determining that the DL traffic matches the DL PDR.

In some embodiments, the FAR includes an address of the second server.

In some embodiments, the method also includes the UP sending, to the CP, an indication that the UP supports traffic redirection triggered by a redirection parameter. In some embodiments, sending the indication to the CP comprises the UP sending to the CP a message comprising a UP Function Features Information Element (IE) comprising the indication.

Embodiments herein afford many advantages, of which a non-exhaustive list of examples follows:

An advantage of the embodiments herein is that they provide a standard way to support redirection based on response codes or timeout so that the UE's traffic can be redirected when the server is not able to provide the requested service. In this scenario the server may either return an error code or not respond at all.

Another advantage of the embodiments herein is that the redirection based on response codes or timeout may be activated by the Control Plane with the required granularity, e.g. per user session.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 9 shows redirect information.

FIG. 10 shows redirect information.

FIG. 11 shows UP function features.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to an Sx protocol extension to support redirection based on a redirection parameter, e.g. response codes or timeout.

As mentioned earlier, 3GPP TS 29.244 V14.1.0 (2017 September) has only specified support for Redirection triggered when the uplink request is received. However, it is NOT specified over Sx interface when Control Plane and User Plane are separated. Nor is it specified how to support Redirection triggered by a response code or by timeout. The response code may be for example an error code.

Figure 3:
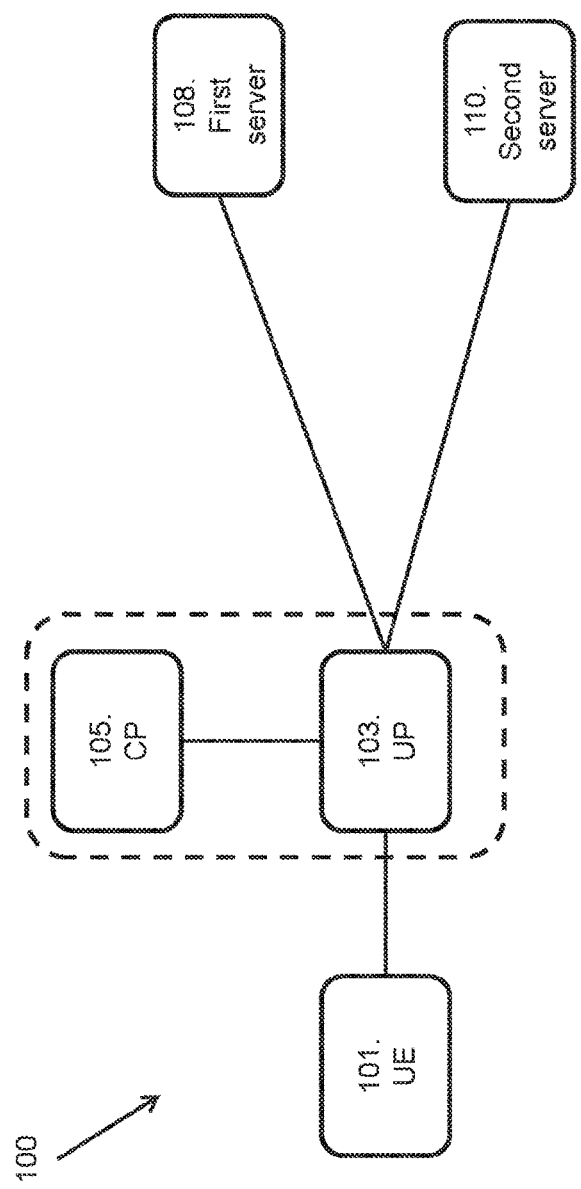
FIG. 3 is a schematic block diagram illustrating a communication system.

FIG. 3 depicts a communications system 100 in which embodiments herein may be implemented. The figure illustrates a User Equipment (UE) 101. The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE or a server.

The UE 101 is adapted to be connected to the User Plane (UP) 103. The UP 103 may be represented by a user plane entity, a user plane function, a SGW-U, a PGW-U a TDF-U etc. The term UP will be used herein when referring to any entity located in the user plane.

The UP 103 is adapted to be connected to a User Plane (CP) 105. The CP 105 may be represented by a control plane entity, a control plane function, a SGW-C, a PGW-C a TDF-C etc. The term UP will be used herein when referring to any entity located in the control plane.

Figure 1:
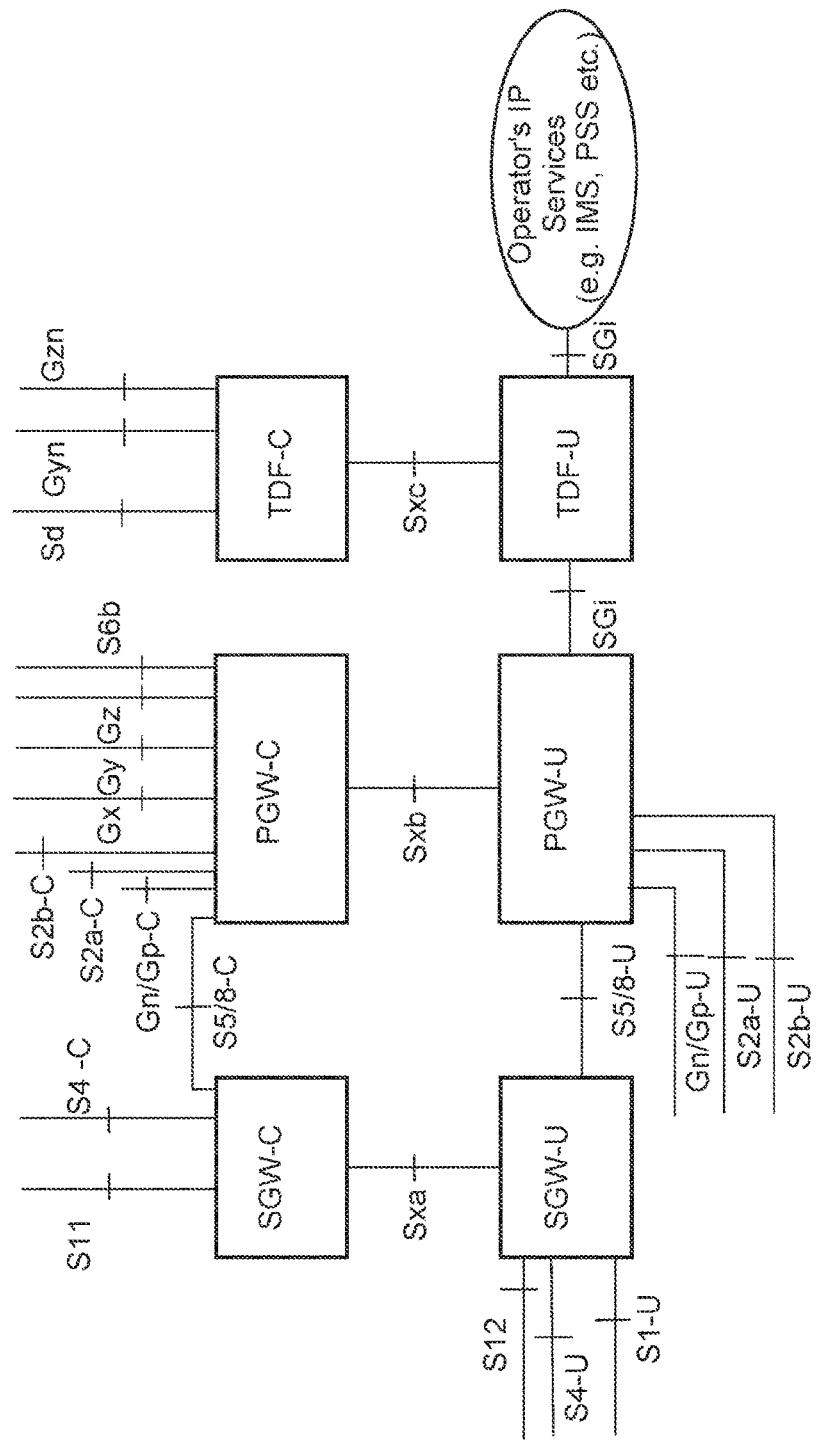
FIG. 1 is a schematic block diagram illustrating an example of an architecture reference model in the case of separation between control plane and user plane.
Figure 2:
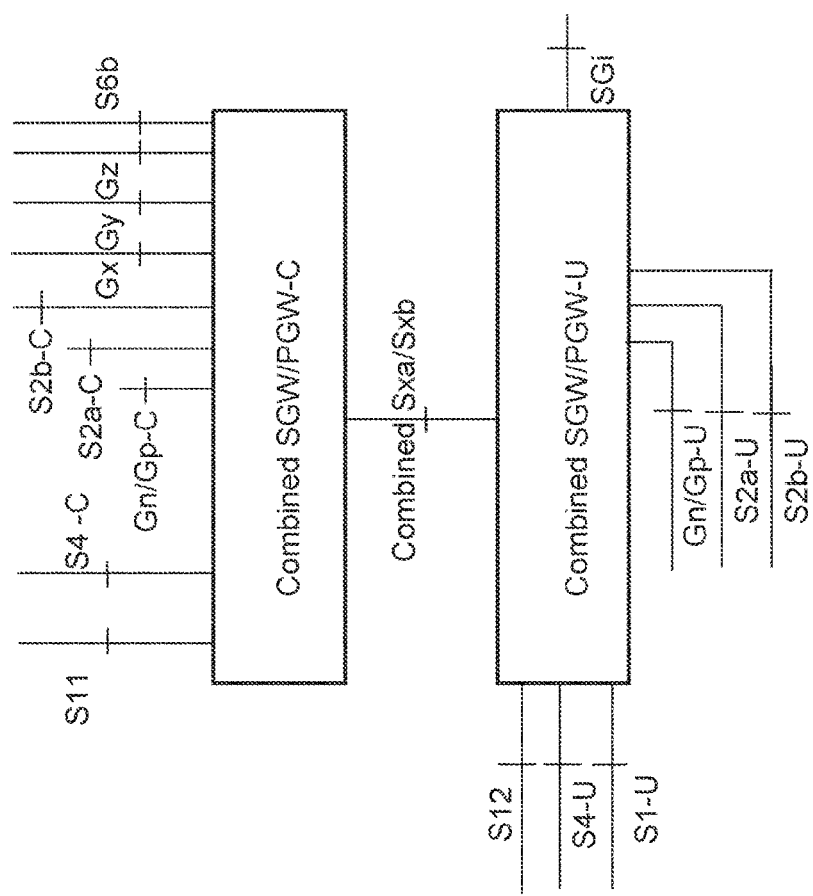
FIG. 2 is a schematic block diagram illustrating an example of the architecture reference model for a combined SGW/PGW in the case of separation between control plane and user plane.

The UP 103 and the CP 105 may be separate standalone entities or they may be co-located. The co-location is illustrated with the dotted box in FIG. 1.

The UP 103 is adapted to be connected to a first server (S1) 108 and a second server (S2) 110. The first server 108 may be a first Application Server (AS) and the second server 110 may be a second AS.

Note that there may be additional entities in the communications system 100 which are not illustrated in FIG. 3 for the sake of simplicity. For example, there may be a Radio Access Network (RAN) located between the UE 101 and the UP 103.

It should be noted that the communication links in the communications system 100 may be of any suitable kind including either a wired or wireless link. The link may use any suitable protocol depending on type and level of layer (e.g. as indicated by the OSI model) as understood by the person skilled in the art.

The embodiments herein propose a mechanism to add Sx support for Redirection triggered by a response code or by timeout, as follows:

The UP 103 indicates to the CP 105, e.g. through the Sx interface, support for the capability of Redirection triggered by a response code or by timeout. The timeout may be in the form of a timer, a timeout value, a timer value, a timer having a certain duration etc. This may be done through PFCP Association procedure, e.g. Setup and/or Update, by adding a new capability for Redirection triggered by a response code or by timeout in the "UP Function Features" IE as follows, the new capability is on the last row in the Table 1 UP Function Features below and with bold fonts:

TABLE 1

UP Function Features

| Feature Octet/Bit | Feature | Interface | Description |
|---|---|---|---|
| 5/1 | BUCP | Sxa | Downlink Data Buffering in CP function is supported by the UP function. |
| 5/2 | DDND | Sxa | The buffering parameter 'Downlink Data Notification Delay' is supported by the UP function. |
| 5/3 | DLBD | Sxa | The buffering parameter 'DL Buffering Duration' is supported by the UP function. |
| 5/4 | TRST | Sxb, Sxc | Traffic Steering is supported by the UP function. |
| 5/5 | FTUP | Sxa, Sxb | F-TEID allocation/release in the UP function is supported by the UP function. |
| 5/6 | PFDM | Sxb, Sxc | The PFD Management procedure is supported by the UP function. |
| 5/7 | HEEU | Sxb, Sxc | Header Enrichment of Uplink traffic is supported by the UP function. |
| 5/8 | TREU | Sxb, Sxc | Traffic Redirection Enforcement in the UP function is supported by the UP function. |
| 6/1 | EMPU | Sxa, Sxb | Sending of End Marker packets supported by the UP function. |
| 6/2 | TRRU | Sxb, Sxc | Traffic Redirection triggered by a response code or timeout Enforcement is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

Figure 4:
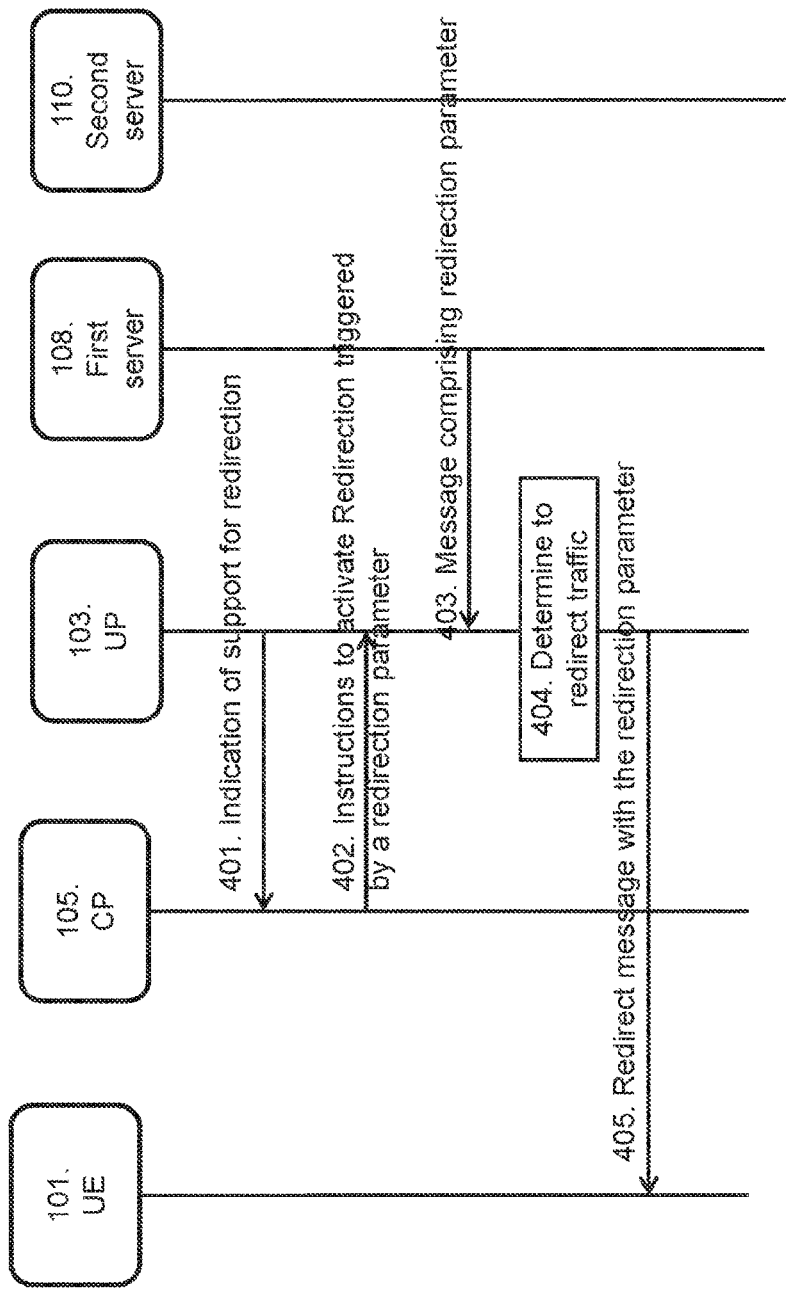
FIG. 4 is a sequence diagram illustrating an example of a method.

When CP creates/updates an Sx session, CP indicates UP to activate Redirection triggered by a response code or by timeout. There may be different alternatives to do this. Two alternative solutions are exemplified herein, referred to as alternative 1 and alternative 2. However, first the method will be described with reference to FIG. 4:

A method according to some embodiments will now be described with reference to the combined signalling diagram and flowchart depicted in FIG. 4. The method comprises the following steps, which steps may as well be carried out in another suitable order than described below.

Step 401

The UP 103 may send, to the CP 105, an indication of that the UP supports the traffic redirection triggered by a redirection parameter. The redirection parameter may be a response code or a timeout. The response code may be for example an error code or a status code etc. The timeout may also be referred to as a timer associated with no receipt of a response.

Step 402

The UP 103 receives, from the CP 105, instructions to activate Redirection triggered by a redirection parameter.

Step 403

The UP 103 receives, from the first server 108, a message comprising a redirection parameter.

Step 404

Triggered by the received message in step 403, the UP 103 determines that the traffic should be redirected.

Step 405

The UP 103 redirects traffic. The redirection is done by the UP 103 sending a redirect message to the UE 101 with the redirection parameter received from the first server. The redirect message indicates that traffic should be redirected to the second server 110 according to the redirection parameter.

The UP 103 may determine to redirect the traffic when the message from the first server 108 has been detected.

If timeout happens, it means that no message is received from the first server 108 in a long time, nothing received within the time set by a timer.

Now continuing to the two alternatives mentioned earlier, i.e. alternative 1 and alternative 2.

Figure 5:
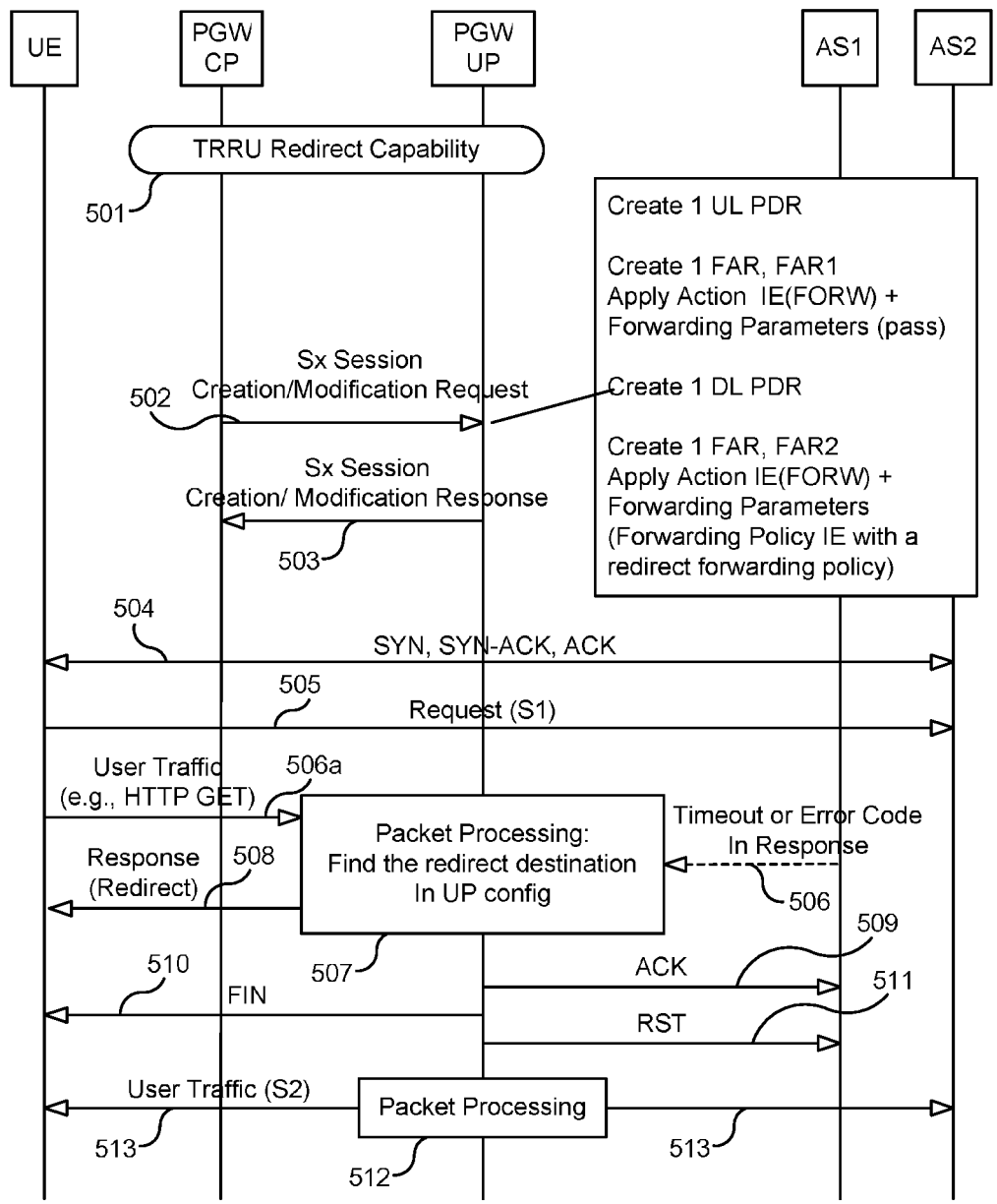
FIG. 5 is a sequence diagram illustrating an example of a method.

Alternative 1:

The UP 103 triggers a Redirect message to the second server 110 in step 505 at detection of a message from the first server 108 with a certain redirection parameter, e.g. with certain response code/s, e.g. typically error codes like 4xx or 5xx, or at timeout, e.g. waiting for a response from the first server. A new TCP connection will be established between the UE 101 and the second server 110, and the old TCP connection between the UE 101 and the first server 108 may be terminated or unused. This is shown in FIG. 5 where the UP 103 is represented by a PGW UP, the CP 105 is represented by a PGW CP. The first server 108 is represented by a first AS and the second server 110 is represented by a second AS.

The method for alternative 1 illustrated in FIG. 5 comprises at least one of the following steps, which steps may be performed in any suitable order than described below:

Step 501

This may be an optional step. A TRRU Redirect capability may be exchanged between the CP and the UP. The UP 103 may report to the CP 105 the capability of Redirection triggered by redirection parameter, e.g. a response code or by timeout. This step 501 may be seen as a precondition. As an alternative, the CP 110 may assume, without receiving any such report, that the UP 103 has this capability.

Step 502

The CP 105 sends a message to the UP 103. The message may be an Sx Request message. The message may be an Sx Establishment Request message (as illustrated in FIG. 5) or it may be an Sx session Creation Request or it may be an Sx Session Modification Request message.

At the Sx Request, the CP will activate a DL PDR (to match DL traffic) associated to a FAR. In other words, the DL PDR is included in the message sent from the CP 105 to the UP 103 in step 502. The FAR includes a Forwarding Policy IE, which has a Redirect forwarding policy. The specifics of this Redirect forwarding policy may be locally configured in the UP 103, e.g. including the specific redirection parameter, e.g. response codes or timeout, to trigger this type of redirection. These response codes may be for example error codes 4xx, 5xx. Similarly, the specific timeout value may also be assumed to be locally configured in the UP 103, and may have the value of e.g. 5 seconds.

The step may also involve that the UP 103 creates some of the following:

UL PDR.
FAR, FAR 1: Apply Action IE (FORW)+Forwarding Parameters (pass).
DL PDR.
FAR, FAR 2: Apply Action IE (FORW)+Forwarding Parameters (Forwarding Policy IE with a Redirect forwarding policy).

The term PDR used above will now be shortly described. The CP function is responsible for instructing the UP function about how to detect user data traffic belonging to a Packet Detection Rule (PDR). The other parameters provided within a PDR describe how the UP function shall treat a packet that matches the detection information. The CP function controls the traffic detection at the UP function by providing detection information for every PDR. Detection information is a combination of:

UE IP address;
F-TEIDu;
SDF filters
Application ID (referring to an application detection filter).

Step 503

The UP 103 sends an Sx Response message to the CP 105. This is a response to the message in step 502. The Sx response message may be an Sx Establishment Response message (as illustrated in FIG. 5) or it may be an Sx session Creation Response or it may be an Sx Session Modification Response message.

Step 504

Synchronization takes place between the UE 101 and the first server 108.

Step 505

The UE 101 sends a request message to the first server 108.

Step 506

The UP 103 receives message from the first server 108. The message may be a response message. The message may comprise the redirection parameter, e.g. a timeout or response code. The response code may be in the form of an error code. In other words, a timeout or the response code has happened.

Step 506a

The UE 101 sends user traffic, e.g. HTTP GET, to the UP 103. The user traffic may be referred to as UL traffic or UL packets.

Step 507

The UP 103 performs packet processing message from step 506. The packet processing may comprise to find the redirect destination in UP configuration. Using other words, this packet processing may involve that the UP 103 determines that the packet matches the DL PDR above from step 502. As this DL PDR is associated to a FAR which includes a Redirect forwarding policy (as described in step 502 above), the UP 103 will check if the received redirection parameter matches the locally configured redirection parameter in the UP 103. For example, the UP 103 checks if the received response code, e.g. 401, matches with any of the locally configured response codes.

Step 508

If there is a match in step 507, redirection will be triggered by means of generating a Redirect response message which is sent from the UP 103 to the UE 101, and by dropping the previously received downlink packet, e.g. 401. Additionally, the TCP connection between the UE 101 and the first server 108 will be closed. The response message in step 508 may be a response to the request message in step 505.

Step 509

The UP 103 may send an acknowledgement message to the first server 108.

Step 510

The UP 103 may send a FIN message to the UE 101.

Step 511

The UP 103 may send a RST message to the first server 108.

Step 512

The UP 103 performs packet processing.

Step 513

User traffic is sent between the second server 110 and the UE 101.

As mentioned above, the Sx message sent in FIG. 5 may be an Sx Session Establishment procedure or it may be an Sx session Creation procedure or an Sx Session Modification procedure. These two procedures will now be shortly described.

Figure 6:
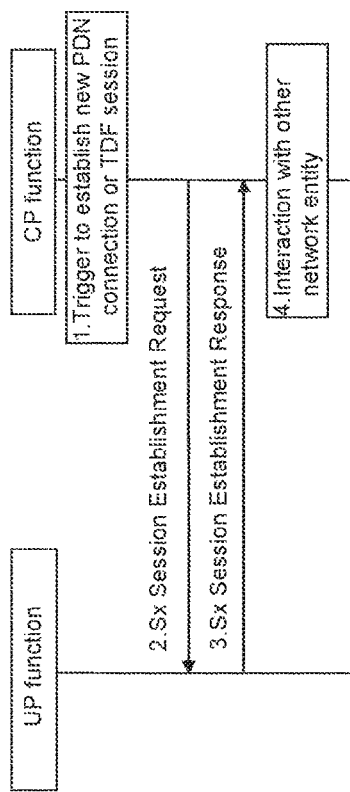
FIG. 6 is a flow chart illustrating an example of a session establishment procedure.

FIG. 6 illustrates an Sx session establishment procedure as in the prior art disclosed by 3GPP TS 23.214 V15.1.0 (2017 December). The procedure illustrated in FIG. 6 comprises at least one of the following steps:
1) CP function receives the trigger to establish a new PDN connection or TDF session from a peer CP function, an MME or a PCRF.
2) The CP function sends an Sx session establishment request message to the UP function that contains the structured control information which defines how the UP function needs to behave.
3) The UP function responds with an Sx session establishment response message containing any information that the UP function has to provide to the CP function in response to the control information received.
4) The CP function interacts with the network entity which triggered this procedure (e.g. a peer CP function, an MME or a PCRF).

In case of a TDF in unsolicited reporting mode, the procedure is triggered by TDF configuration and step 1 and 4 may not apply.

Note that the messages illustrated in FIG. 6 comprise additional messages as described above with reference to FIGS. 4 and 5.

Figure 7:
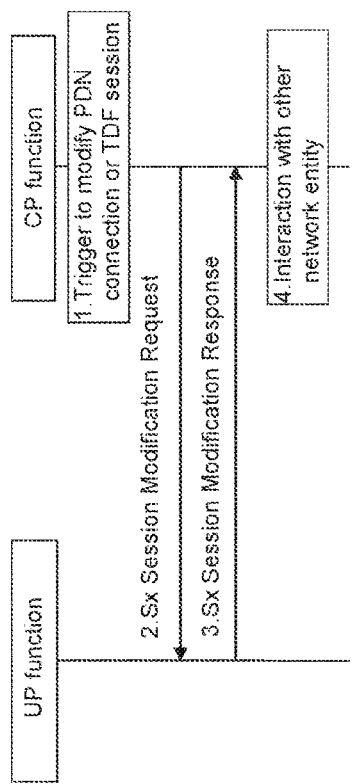
FIG. 7 is a flow chart illustrating an example of a session modification procedure.

FIG. 7 illustrates an Sx session modification procedure as in the prior art disclosed by 3GPP TS 23.214 V15.1.0 (2017 December). The Sx session modification procedure is used to update the Sx session context of an existing PDN connection, IP-CAN session, TDF session or TDF in unsolicited reporting mode at the UP function. The Sx session modification procedure is executed between SGW-C and SGW-U whenever PDN connection related parameters have to be modified, as well as between PGW-C and PGW-U whenever PDN connection or IP-CAN session related parameters have to be modified. The Sx session modification procedure is executed between TDF-C and TDF-U whenever TDF session related parameters have to be modified. For a TDF in unsolicited reporting mode, the Sx session modification procedure is executed between TDF-C and TDF-U whenever instructions for application detection and reporting have to be modified.

The procedure illustrated in FIG. 7 comprises at least one of the following steps:
1) CP function receives the trigger to modify the existing PDN connection or TDF session from a peer CP function, an MME or a PCRF.
2) The CP function sends an Sx session modification request message to the UP function that contains the update for the structured control information which defines how the UP function needs to behave.
3) The UP function identifies the Sx session context to be modified by the Session ID. Then, the UP function updates the parameters of this Sx session context according to the list of parameters sent by the CP function. The UP function responds with an Sx session modification response message containing any information that the UP function has to provide to the CP function in response to the control information received.
4) The CP function interacts with the network entity which triggered this procedure (e.g. a peer CP function, an MME or a PCRF).

In case of a TDF in unsolicited reporting mode, the procedure is triggered by TDF configuration and step 1 and 4 do not apply.

Alternative 2:

In alternative 2, the UP 103 acts as a HTTP proxy acting as server to UE, and as client to the first and second servers 108, 110. Once the UP detects a certain redirection parameter, e.g. a response code, in the HTTP response message, e.g. typically error codes like 4xx or 5xx, a new FAR will be activated. This FAR will indicate that upon subsequent UL traffic detected by the same UL PDR rule, the UP 103 will redirect the traffic to the second server 110 according to Redirection Information IE. The method for alternative 2 comprises at least one of the following steps, which steps may be performed in any suitable order than described below:

Step 701

As a precondition, UP has reported to CP the capability of Redirection triggered by a redirection parameter. The redirection parameter may be for example a response code or a timeout.

Step 702

At Sx Session Request, the CP will provision:
DL PDR, requiring UP function to retrieve redirection parameter. For example to retrieve the HTTP response/status code or to monitor if the request has timeout. This DL PDR will have an associated FAR, to forward DL traffic to the UE/SGW, and should have extra information to instruct UP to replace the e.g. 4xx or 5xx response/status code with the 302 status code and to include the Redirect URI (pointing to S2) in Location header. The timeout is for the user traffic, e.g. HTTP GET.

UL PDR with two associated FARs:
A first FAR to send UL traffic via the SGi to an external network.
A second FAR to redirect. This second FAR is not active until the redirection parameter match is detected, e.g. until a response or timeout is detected. Once such response/status code is matched or timeout is detected, the corresponding UL PDR shall be linked to this second FAR to redirect UE to S2.

The SGi mentioned above is an interface between a gateway and an external network, for example between the PGW and a PDN, between the PGW-U and a PDN, a UP and the PDN etc.

The Sx Session Request may be Sx Session Establishment Request or it may be an Sx session Creation Request or Sx Session Modification Request.

Step 703

The UP 103 receives a DL packet matching the DL PDR above, e.g. 401 error status code. At this time, the second FAR described above will be activated.

Step 704

The UP 103 receives a subsequent UL packet matching the UL PDR described above. Redirection will be triggered by means of generating a Redirect response message towards the UE 101.

Figure 8:
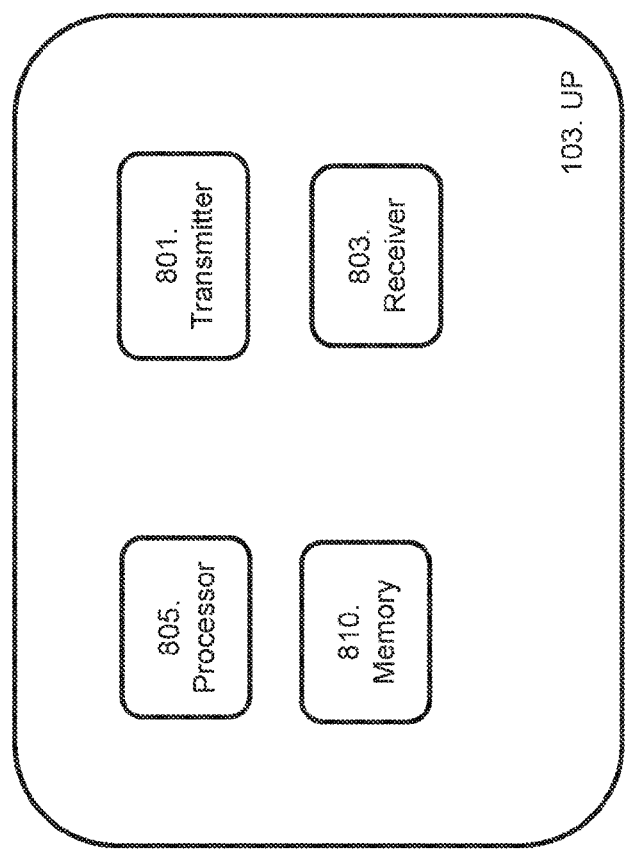
FIG. 8 is a schematic block diagram illustrating an example of a UP.

To perform the method steps described above, the UP 103 may comprises an arrangement as shown in FIG. 8.

The UP may be arranged to, e.g. by means of a transmitter 801, send, to the Control Plane, CP, an indication of that the UP supports the traffic redirection triggered by redirection parameter.

The UP 103 may be arranged to, e.g. by means of a receiver 803, receive, from the CP, instructions to activate Redirection triggered by a redirection parameter.

The UP 103 may be arranged to, e.g. by means of the receiver 803, receive, from the first server (S1), a message comprising a redirection parameter.

The UP 103 may be arranged to, e.g. by means of a processor 805, determine to redirect the traffic.

The UP 103 may be arranged to, e.g. by means of the transmitter 801, when the message from the first server (S1) has been detected, redirect (308) traffic by sending a redirect message to the UE with the redirection parameter from the first server. The redirect message indicates that traffic should be redirected to the second server (S2) according to the redirection parameter.

The UP may be arranged to:
send, e.g. by means of the transmitter 801, to the Control Plane, CP, an indication of that the UP supports the traffic redirection triggered by the redirection parameter;
receive, e.g. by means of the receiver 803, an Sx Session Request message from the CP, wherein the Sx Session Request message comprises a DL PDR to match traffic, wherein the DL PDR is associated with a Redirect forwarding policy, and wherein redirection parameter associated with the Redirect forwarding policy are locally configured in the UP;
receive, e.g. by means of the receiver 803, a DL packet from the first server (S1) which matches the DL PDR, wherein the DL packet comprises the redirection parameter;
check, e.g. by means of the processor 805, if the redirection parameter in the received DL packet matches any of the locally configured redirection parameter;
when there is a match of redirection parameter, send, e.g. by means of the transmitter 801, a redirect message to the UE and dropping the received DL packet.

The UP may be arranged to:
send, e.g. by means of the transmitter 801, to the Control Plane, CP, an indication of that the UP supports the traffic redirection triggered by the redirection parameter;
receive, e.g. by means of the receiver 803, an Sx Session Request message from the CP, wherein the Sx Session Request message comprises a DL PDR associated with a first FAR, wherein the DL PDR indicates to the UP to evaluate the redirection parameter, e.g. to retrieve a response code or to monitor if the Sx Session Request message has timed out;
receive, e.g. by means of the receiver 803, DL traffic matching the DL PDR from the first server (S1);
activate, e.g. by means of the processor 805, the second FAR when the matching DL traffic is received;
redirect, e.g. by means of the processor 805, subsequent UL traffic to the S2.

In some embodiments, the UP 101 comprises the processor 805 and a memory 810. The memory 810 comprises instructions executable by the processor 805. The memory 805 is arranged to be used to store data, received data streams, power level measurements, messages, the redirection parameter, response codes, timer, timeout value, requests, responses, traffic, instructions, indications, information elements (IE), decisions, to perform the methods herein when being executed UP 101.

In some embodiments, a computer program may comprise instructions which, when executed on at least one processor, cause the at least one processor to carry out the method steps described above. A carrier may comprise the computer program, and the carrier is one of an electronic signal, optical signal, radio signal or computer readable storage medium.

The present mechanism may be implemented through one or more processors, such as a processor 805 in the UP arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the UP 103. One such carrier may be in the form of a CD ROM disc. It is however feasible with other data carriers such as a memory stick. The computer program code can furthermore be provided as pure program code on a server and downloaded to the UP 103.

The embodiments herein relate to support for DL redirection. 3GPP TS 29.244 only specifies support for Redirection triggered when the uplink request is received, but it is NOT specified how to support Redirection triggered by a redirection parameter, e.g. a response code (typically an error code) and/or by timeout over Sx interface, when Control Plane and User Plane is separated. And redirection for port number is not supported in 29.244. The embodiments herein propose to add Sx support for Redirection triggered by a redirection parameter. And redirection for port number is also included.

Traffic Redirection

Traffic Redirection refers to the process of redirecting uplink and downlink application traffic, in a PGW or TDF, towards a redirect destination, e.g. redirect some HTTP flows to a service provisioning page.

The redirect destination may be provided by the PCRF or be preconfigured in the CP function or in the UP function.

The traffic redirection may be enforced in the CP function or in the UP function. If the traffic that the UP function can support may be subject to traffic redirection, traffic redirection enforcement in the UP function shall be supported by the UP function. The UP function reports to the CP function whether it supports traffic redirection enforcement in the UP function via the UP Function Features IE.

A UP function that supports traffic not requiring traffic redirection does not need to support traffic redirection enforcement in the UP function. The CP function can select a UP function supporting traffic redirection enforcement in the UP function for users or services which may require traffic redirection.

To enforce the traffic redirection in the CP function, the CP function shall instruct the UP function to forward the applicable user traffic to the CP function. To enforce the traffic redirection in the UP function, the CP function shall:
create the necessary PDR(s) to represent the traffic to be redirected, if not already existing;
create a FAR with:
the Redirect Information IE including the redirect destination, if the traffic needs to be redirected towards a redirect destination provided by the CP function; a redirect destination provided by the CP function shall prevail over a redirect destination preconfigured in the UP function; or
the Forwarding Policy IE including the identifier of the forwarding policy to apply, if the traffic needs to be redirected towards a redirect destination preconfigured in the UP function;
associate the FAR to the above PDRs of the Sx session.
Create FAR IE within Sx Session Establishment Request The Create FAR grouped IE shall be encoded as shown in Table 2.

TABLE 2

Create FAR IE within Sx Session Establishment Request

| Octet 1 and 2 | | Create FAR IE Type = 3 (decimal) | | | | |
|---|---|---|---|---|---|---|
| Octets 3 and 4 | | Length = n | | | | |
| Information | | | | Appl. | | |
| elements | P | Condition/Comment | Sxa | Sxb | Sxc | IE Type |
| FAR ID | M | This IE shall uniquely identify the FAR among all the FARs configured for that Sx session. | X | X | X | FAR ID |
| Apply Action | M | This IE shall indicate the action to apply to the packets, See subclauses 5.2.1 and 5.2.3. | X | X | X | Apply Action |
| Forwarding Parameters | C | This IE shall be present when the Apply-Action requests the packets to be forwarded. It may be present otherwise. When present, this IE shall contain the forwarding instructions to be applied by the UP function when the Apply-Action requests the packets to be forwarded. See table 7.5.2.3-2. | X | X | X | Forwarding Parameters |
| Duplicating Parameters | C | This IE shall be present when the Apply-Action requests the packets to be duplicated. It may be present otherwise. When present, this IE shall contain the forwarding instructions to be applied by the UP function for the traffic to be duplicated, when the Apply-Action requests the packets to be duplicated. See table 7.5.2.3-3. | X | X | — | Duplicating Parameters |
| BAR ID | O | When present, this IE shall contain the BAR ID of the BAR defining the buffering instructions to be applied by the UP function when the Apply Action requests the packets to be buffered. See table 7.5.2.6-1. | X | — | — | BAR ID |

TABLE 3

Forwarding Parameters IE in FAR

| Octet 1 and 2 | | Forwarding Parameters IE Type = 4 (decimal) | | | | |
|---|---|---|---|---|---|---|
| Octets 3 and 4 | | Length = n | | | | |
| Information | | | | Appl. | | |
| elements | P | Condition/Comment | Sxa | Sxb | Sxc | IE Type |
| Destination Interface | M | This IE shall identify the destination interface of the outgoing packet. | X | X | X | Destination Interface |
| Network Instance | O | When present, this IE shall identify the Network instance towards which to send the outgoing packet. See NOTE 1. | X | X | X | Network Instance |
| Redirect Information | C | This IE shall be present if the UP function is required to enforce traffic redirection towards a redirect destination provided by the CP function. | — | X | X | Redirect Information |
| Outer Header Creation | C | This IE shall be present if the UP function is required to add one or more outer header(s) to the outgoing packet. If present, it shall contain the F-TEID of the remote GTP-U peer when adding a GTP-U/UDP/IP header, or the Destination IP address and Port Number when adding a UDP/IP header. | X | X | — | Outer Header Creation |
| Transport Level Marking | C | This IE shall be present if the UP function is required to mark the IP header with the DSCP marking as defined by IETF RFC 2474 [22]. When present, it shall contain the value of the DSCP in the TOS/Traffic Class field set based on the QCI, and optionally the | X | X | — | Transport Level Marking |

TABLE 3-continued

Forwarding Parameters IE in FAR

| Octet 1 and 2 | Forwarding Parameters IE Type = 4 (decimal) |
| Octets 3 and 4 | Length = n |

| Information elements | P | Condition/Comment | Appl. Sxa | Sxb | Sxc | IE Type |
|---|---|---|---|---|---|---|
| Forwarding Policy | C | ARP priority level, of the associated EPS bearer, as described in sub-clause 4.7.3 of 3GPP TS 23.214 [2]. This IE shall be present if a specific forwarding policy is required to be applied to the packets. It shall be present if the Destination Interface IE is set to SGi-LAN. It may be present if the Destination Interface is set to Core or Access(for DL redirection). When present, it shall contain an Identifier of the Forwarding Policy locally configured in the UP function. | — | X | X | Forwarding Policy |
| Header Enrichment | O | This IE may be present if the UP function indicated support of Header Enrichment of UL traffic. When present, it shall contain information for header enrichment. | — | X | X | Header Enrichment |

NOTE 1:
The Network Instance parameter is needed e.g. in the following cases:
PGW/TDF UP function supports multiple PDNs with overlapping IP addresses;
SGW UP function is connected to PGWs in different IP domains (S5/S8);
PGW UP function is connected to SGWs in different IP domains (S5/S8);
SGW UP function is connected to eNodeBs in different IP domains.

TABLE 4

Duplicating Parameters IE in FAR

| Octet 1 and 2 | Duplicating Parameters IE Type = 5 (decimal) |
| Octets 3 and 4 | Length = n |

| Information elements | P | Condition/Comment | Appl. Sxa | Sxb | Sxc | IE Type |
|---|---|---|---|---|---|---|
| Destination Interface | M | This IE shall identify the destination interface of the outgoing packet. | X | X | — | Destination Interface |
| Outer Header Creation | C | This IE shall be present if the UP function is required to add one or more outer header(s) to the outgoing packet. If present, it shall contain the F-TEID of the remote GTP-U peer. | X | X | — | Outer Header Creation |
| Transport Level marking | C | This IE shall be present if the UP function is required to mark the IP header with the DSCP marking as defined by IETF RFC 2474 [22]. When present, it shall contain the value of the DSCP in the TOS/Traffic Class field. | X | X | — | Transport Level Marking |
| Forwarding Policy | C | This IE shall be present if a specific forwarding policy is required to be applied to the packets. When present, it shall contain an Identifier of the Forwarding Policy locally configured in the UP function. | X | X | — | Forwarding Policy |

Redirect Information

Redirect Information is coded as depicted in FIG. 10.

Redirect Address Type indicates the type of the Redirect Address. It shall be encoded as defined in Table 5.

TABLE 5

Redirect Address Type

| Redirect Address Type | Value (Decimal) |
|---|---|
| IPv4 address | 0 |
| IPv6 address | 1 |
| URL | 2 |
| SIP URI | 3 |
| Port | 4 |
| Spare, for future use. | 5 to 15 |

The Redirect Server Address Length shall indicate the length of the Redirect Server Address.

The Redirect Server Address shall be encoded in UTF8String format and shall contain the address of the redirect server (e.g. HTTP redirect server, SIP server) with which the end user is to be connected.

The UP Function Features IE indicates the features supported by the UP function. It is coded as depicted in FIG. 11.

The UP Function Features IE takes the form of a bitmask where each bit set indicates that the corresponding feature is supported. Spare bits shall be ignored by the receiver. The same bitmask is defined for all PFCP interfaces.

The following table specifies the features defined on PFCP interfaces and the interfaces on which they apply.

TABLE 6

UP Function Features

| Feature Octet/Bit | Feature | Interface | Description |
|---|---|---|---|
| 5/1 | BUCP | Sxa | Downlink Data Buffering in CP function is supported by the UP function. |
| 5/2 | DDND | Sxa | The buffering parameter 'Downlink Data Notification Delay' is supported by the UP function. |
| 5/3 | DLBD | Sxa | The buffering parameter 'DL Buffering Duration' is supported by the UP function. |
| 5/4 | TRST | Sxb, Sxc | Traffic Steering is supported by the UP function. |
| 5/5 | FTUP | Sxa, Sxb | F-TEID allocation/release in the UP function is supported by the UP function. |
| 5/6 | PFDM | Sxb, Sxc | The PFD Management procedure is supported by the UP function. |
| 5/7 | HEEU | Sxb, Sxc | Header Enrichment of Uplink traffic is supported by the UP function. |
| 5/8 | TREU | Sxb, Sxc | Traffic Redirection Enforcement in the UP function is supported by the UP function. |
| 6/1 | EMPU | Sxa, Sxb | Sending of End Marker packets supported by the UP function. |
| 6/2 | TRRU | Sxb, Sxc | Traffic Redirection triggered by a response code and/or timeout Enforcement is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

Summarized, the embodiments herein propose to add Sx support for Redirection triggered by a response code or by timeout, specifically:

The UP indicates to the CP (through Sx) support for the capability of Redirection triggered by a response code or by timeout.

On a per Sx session basis, the CP indicates to the UP, through Sx, to activate Redirection triggered by a response code or by timeout.

The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment. Also, the teachings herein are equally applicable for N4 interface between SMF and UPF.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined herein, without departing from the embodiments herein, be performed in another order than the order in which they appear.

EXAMPLE EMBODIMENTS

Some embodiments described herein may be summarised in the following manner:

A method performed by a User Plane, UP, the method comprising at least one of the following steps: sending (301), to the Control Plane, CP, an indication of that the UP supports the traffic redirection triggered by a redirection parameter; receiving (302), from the CP, instructions to activate Redirection triggered by the redirection parameter; receiving (306), from the first server (S1), a message comprising a redirection parameter; redirecting (308) traffic by sending a redirect message to the UE with the parameter received from the first server, wherein the redirect message indicates that traffic should be redirected to the second server (S2) according to the parameter.

The method may further comprise: comparing the redirection parameter received from the first server with the redirection parameter received from the CP; wherein the traffic is redirected when a result of the comparing indicates that the two redirection parameters are matching or that they are substantially matching.

The traffic redirection is triggered by receipt of the redirection parameter.

The redirection parameter may be: a response code, or a timeout, or both a response code and a timeout.

The traffic may be redirected to a certain redirect destination. The redirect destination may be the second server.

It may be UL traffic or DL traffic or both UL and DL traffic that should be redirected to the redirect destination.

The indication of that the UP supports the traffic redirection triggered by the redirection parameter may be comprised in the UP Function Features IE.

The instructions to activate Redirection triggered by the redirection parameter may be sent in: an Sx Session Establishment Request message, or an Sx session Creation Response, or an Sx Session Modification Response message.

A method performed by a User Plane, UP, the method comprising at least one of the following steps: sending (501), to the Control Plane, CP, an indication of that the UP supports the traffic redirection triggered by the redirection parameter; receiving (502) an Sx Session Request message from the CP, wherein the Sx Session Request message comprises a DL PDR to match traffic, wherein the DL PDR is associated with a Redirect forwarding policy, and wherein the redirection parameter associated with the Redirect forwarding policy are locally configured in the UP; receiving (506) a DL packet from the first server (S1) which matches the DL PDR, wherein the DL packet comprises the redirection parameter; checking (507) if the redirection parameter in the received DL packet matches the locally configured the redirection parameter; when there is a match of the redirection parameter, sending (508) a redirect message to the UE and dropping the received DL packet.

The DL PDR may be associated with a FAR.

The TCP connection between the UE and the S1 may be closed.

A method performed by a User Plane, UP, the method comprising at least one of the following steps: sending (501), to the Control Plane, CP, an indication of that the UP supports the traffic redirection triggered by the redirection parameter; receiving (502) an Sx Session Request message from the CP, wherein the Sx Session Request message comprises a DL PDR associated with a first FAR, wherein the DL PDR indicates to the UP to retrieve a response code or to monitor if the Sx Session Request message has timed out; receiving DL traffic matching the DL PDR from the first server (S1); activating the second FAR when the matching DL traffic is received; redirecting subsequent UL traffic to the S2.

The UL PDR may be associated with: a first FAR which indicates that UL traffic should be sent via the SGi to an external network and/or a second FAR which indicates redirection of traffic from the first server (S1) to the second server (S2), and/or both the first and second FAR.

The second FAR may be inactive until the redirection parameter math is detected, e.g. until a response code is detected or until a timeout is detected.

When the redirection parameter math is detected, the corresponding UL PDR may be linked to the second FAR The instructions to activate Redirection triggered by the redirection parameter may be received through Sx interface.

The UP is a UP entity such as e.g. a User Plane Function, UPF, a gateway UP, a PGW UP, a UP proxy, a HTTP proxy, an entity acting as a server to the UE, PGW-U, TDF-U.

The CP is a CP entity such as a gateway CP, a PGW CP, a CP proxy, a HTTP proxy, an entity acting as a server to the UE, PGW-C or TDF-C.

There is a direct interface between the UP and CP so that they are adapted to communicate directly with each other. The interface may be an Sx interface.

CP and UP are separated.

A User Plane, UP, arranged to: send, to the Control Plane, CP, an indication of that the UP supports the traffic redirection triggered by response code or by timeout; receive, from the CP, instructions to activate Redirection triggered by a response code or by timeout; receive, from the first server (S1), a message comprising a response code or a timeout value; when the message from the first server (S1) has been detected, redirect (308) traffic by sending a redirect message to the UE with the response code or timeout value from the first server, wherein the redirect message indicates that traffic should be redirected to the second server (S2) according to the response code or timeout.

A User Plane, UP, arranged to: send, to the Control Plane, CP, an indication of that the UP supports the traffic redirection triggered by response code or by timeout; receive an Sx Session Request message from the CP, wherein the Sx Session Request message comprises a DL PDR to match traffic, wherein the DL PDR is associated with a Redirect forwarding policy, and wherein response codes or timeout values associated with the Redirect forwarding policy are locally configured in the UP; receive a DL packet from the first server (S1) which matches the DL PDR, wherein the DL packet comprises response codes or timeout value; check if the response codes or timeout value in the received DL packet matches any of the locally configured response codes or time out values; when there is a match of response codes or timeout value, send a redirect message to the UE and dropping the received DL packet.

A User Plane, UP, arranged to: send, to the Control Plane, CP, an indication of that the UP supports the traffic redirection triggered by response code or by timeout; receive an Sx Session Request message from the CP, wherein the Sx Session Request message comprises a DL PDR associated with a first FAR, wherein the DL PDR indicates to the UP to retrieve a response code or to monitor if the Sx Session Request message has timed out; receive DL traffic matching the DL PDR from the first server (S1); activate the second FAR when the matching DL traffic is received; redirect subsequent UL traffic to the S2.

ABBREVIATIONS

EPC Evolved Packet Core
CP Control Plane
UP User Plane
DL Downlink
UL Uplink
PDR Packet Detection Rule
FAR Forwarding Action Rule
LTE Long Term Evolution
MTC Machine Type Communication
UE User Equipment
PCRF Policy and Charging Rule Function
PGW Packet Data Network Gateway
SAE System Architecture Evolution
SGW Servicing Network Gateway

The invention claimed is:

1. A method performed by a user plane (UP) node, the method comprising:

the UP node receiving a first message transmitted by a user equipment (UE);

the UP node forwarding the first message to the first server;

after forwarding the first message to the first server, the UP node determining that a redirect message should be sent to the UE, wherein determining that the redirect message should be sent comprises: i) the UP node receiving a response message transmitted by the first server in response to the first message and determining, based on information included in the response message, that the redirect message should be sent to the UE or ii) the UP node detecting a timeout with respect to the first server; and as a result of determining that the redirect message should be sent to the UE, the UP node sending the redirect message to the UE, wherein the redirect message is configured to cause the UE to send a second message to a second server, wherein the method further comprises receiving a message transmitted by a control plane (CP) note, the message comprising a redirection rule, and the message is:

an Sx Session Establishment Request message, an Sx Session Establishment Response message, an Sx Session Modification Request message, or an Sx Session Modification Repsonse message.

2. The method of claim 1, wherein determining that the redirect message should be sent to the UE comprises receiving the response message transmitted by the first server and determining whether the response message includes a redirection parameter that matches any redirection parameter included in a set of one or more redirection parameters, and if the message includes a redirection parameter that matches any redirection parameter included in the set of one or more redirection parameters, then it is determined that the redirection should be sent to the UE.

3. The method of claim 2, wherein the set of redirection parameters include a set of one or more Hypertext Transfer Protocol (HTTP) status codes.

4. The method of claim 3, wherein the set of HTTP status codes comprises status codes that begin with the digit 4 and/or status codes that begin with the digit 5.

5. The method of claim 4, wherein determining whether the response message includes a redirection parameter that matches any redirection parameter included in a set of one or more redirection parameters comprises determining whether the redirection parameter included in the message matches any of the HTTP status codes included in the set of HTTP status codes.

6. The method of claim 4, wherein the redirect message is an HTTP message that includes a status code and a uniform resource identifier (URI) pointing to the second server.

7. The method of claim 1, wherein the redirection rule is a downlink (DL) Packet Detection Rule (PDR) that contains: packet detection information, PDI, and a forwarding action rule (FAR) identifier for identifying a FAR.

8. The method of claim 7, wherein the method comprises receiving a message transmitted by the first server and determining, based on the received message, whether a redirect message should be sent to the UE, receiving the message transmitted by the first server comprises receiving DL traffic transmitted by the first server wherein the DL traffic comprises the message, and the method further comprises determining whether the DL traffic matches the DL PDR and activating the FAR as a result of determining that the DL traffic matches the DL PDR.

9. The method of claim 8, wherein the FAR includes an address of the second server.

10. The method of claim 1, further comprising:

receiving a message transmitted by a control plane (CP) node, the message comprising a redirection rule; and sending, to the CP, an indication that the UP supports traffic redirection triggered by a redirection parameter.

11. The method of claim 10, wherein sending the indication to the CP comprises sending to the CP a message comprising a UP Function Features Information Element (IE) comprising the indication.

12. The method of claim 1, wherein the redirect message is configured to cause the UE to automatically send a message to a second server in response to the UE receiving the redirect message.

13. The method of claim 1, wherein determining that the redirect message should be sent comprises the UP node detecting the timeout with respect to the first server.

14. A computer program product comprising a non-transitory computer readable medium storing a computer program comprising instructions for configuring a user plane (UP) node to perform a method comprising:

in response to receiving a first message transmitted by a user equipment (UE), forwarding the first message to a first server;

after forwarding the first message to the first server, determining that a redirect message should be sent to the UE, wherein determining that the redirect message should be sent comprises: i) determining, based on information included in a response message transmitted by the first server in response to the first message, that the redirect message should be sent to the UE or ii) detecting a timeout with respect to the first server; and as a result of determining that the redirect message should be sent to the UE, sending the redirect message to the UE, wherein the redirect message is configured to cause the UE to send a second message to a second server, wherein the method further comprises receiving a message transmitted by a control plane (CP) node, the message comprising a redirection rule, and the message is:

an Sx Session Establishment Request message, an Sx Session Establishment Response message, an Sx Session Modification Request message, or an Sx Session Modification Response message.

15. A user plane (UP) apparatus, the UP apparatus comprising:

a receiver for receibing a first message transmitted by a user equipment (UE);

a transmitter for forwarding the first message to a first server;

memory; and processing circuitry coupled to the memory, wherein the UP apparatus is configured to:

determine whether a redirect message should be sent to the UE, wherein the determining comprises: i) receiving a response message transmitted by the first server in response to the first message and determining, based on information included in the response message, whether the redirect message should be sent to the UE or ii) detecting whether a timeout with respect to the first server has occurred; and send to the UE the redirect message as a result of determining that redirect message should be sent to the UE, wherein the redirect message is configured to cause the UE to send a second message to a second server, wherein the UP apparatus is further configured to receive a message transmitted by a control plane (CP) node, the message comprising a redirection rule, and the message is:

an Sx Session Establishment Request message, an Sx Session Establishment Response message, an Sx Session Modification Request message, or an Sx Session Modification Response message.

16. The UP apparatus of claim 15, wherein
determining whether a redirect message should be sent to the UE comprises receiving the response message transmitted by the first server and determining whether the response message includes a redirection parameter that matches any redirection parameter included in a set of one or more redirection parameters, and if the message includes a redirection parameter that matches any redirection parameter included in the set of one or more redirection parameters, then it is determined that the redirection should be sent to the UE.

17. The UP apparatus of claim 16, wherein the set of redirection parameters include a set of one or more Hypertext Transfer Protocol (HTTP) status codes.

18. The UP apparatus of claim 17, wherein
the set of HTTP status codes comprises status codes that begin with the digit 4 and/or status codes that begin with the digit 5, and the redirect message is an HTTP message that includes a 302 status code and a uniform resource identifier (URI) pointing to the second server.

19. The UP apparatus of claim 18, wherein determining whether the message includes a redirection parameter that matches any redirection parameter included in a set of one or more redirection parameters comprises determining whether the redirection parameter included in the message matches any of the HTTP status codes included in the set of HTTP status codes.

* * * * *